US012689455B2

(12) United States Patent
Mudulodu et al.

(10) Patent No.: US 12,689,455 B2
(45) Date of Patent: Jul. 21, 2026

(54) METHOD AND APPARATUS TO IMPROVE RECEIVED SIGNAL STRENGTH INDICATOR MEASUREMENT AT A RECEIVER

(71) Applicant: Silicon Laboratories Inc., Austin, TX (US)

(72) Inventors: Sriram Mudulodu, Hyderabad (IN); Manoj Kumar Medam, Hyderabad (IN)

(73) Assignee: Silicon Laboratories Inc., Austin, TX (US)

( * ) Notice: Subject to any disclaimer, the term of this patent is extended or adjusted under 35 U.S.C. 154(b) by 384 days.

(21) Appl. No.: 18/344,116

(22) Filed: Jun. 29, 2023

(65) Prior Publication Data

US 2025/0007630 A1     Jan. 2, 2025

(51) Int. Cl.
*H04B 17/318* (2015.01)
*H04L 27/00* (2006.01)

(52) U.S. Cl.
CPC ....... *H04B 17/318* (2015.01); *H04L 27/0002* (2013.01)

(58) Field of Classification Search
CPC ...... H04B 17/318; H04B 1/16; H04L 27/0002
See application file for complete search history.

(56) References Cited

U.S. PATENT DOCUMENTS 8,437,415 B2   5/2013   Mudulodu et al.
8,644,426 B1   2/2014   Zhou et al.

9,252,999 B1 *   2/2016   Zhang ............... H04L 25/03159
10,827,451 B2   11/2020   Mudulodu
11,632,733 B2   4/2023   Mudulodu et al.
2007/0066259 A1 *   3/2007   Ryan .................... H03G 3/3078
                                            455/226.2
2007/0155341 A1   7/2007   Haiut
2012/0224534 A1 *   9/2012   Kimura ................. H04W 28/06
                                            370/328
2018/0351592 A1 *   12/2018   Coban ................. H03G 3/3078
2021/0075557 A1   3/2021   Mudulodu et al.

FOREIGN PATENT DOCUMENTS

WO     WO-2013054158 A1 *   4/2013   ............. G06K 7/086

OTHER PUBLICATIONS

U.S. Appl. No. 18/322,639, filed May 24, 2023, entitled "Filtering Carrier Frequency Offset Estimations for a Device Pair Combination," by Sriram Mudulodu, 31 pgs.

* cited by examiner

*Primary Examiner* — Charles C Jiang
*Assistant Examiner* — Ryan C Kavleski
(74) *Attorney, Agent, or Firm* — Trop, Pruner & Hu, P.C.

(57) ABSTRACT

In one embodiment, a receiver includes: an analog front end (AFE) circuit to receive and process an incoming radio frequency (RF) analog signal comprising a packet; an analog-to-digital converter (ADC) coupled to the AFE circuit to receive and digitize an analog signal based on the RF analog signal into a digital signal; a packet detector coupled to the ADC to detect the packet based on the digital signal; and a computation circuit coupled to the packet detector. The computation circuit may be configured to determine a received signal strength indicator (RSSI) value based at least in part on a portion of a preamble of the packet.

7 Claims, 5 Drawing Sheets

METHOD AND APPARATUS TO IMPROVE RECEIVED SIGNAL STRENGTH INDICATOR MEASUREMENT AT A RECEIVER

BACKGROUND

In Wireless Local Area Network (WLAN) or other communication systems, a received signal strength indicator (RSSI) measurement is done at a receiver and is used in many applications. For example, an Access Point (AP) can use the RSSI measurement for rate adaptations. A Station can use it to connect to an AP, when there are multiple APs in a region that the station can reach. RSSI is also used in applications such as direction/distance finding or in real-time location systems. Existing measurement techniques incur high overhead, latency and computation complexity, and can suffer from poor fidelity.

SUMMARY OF THE INVENTION

In one aspect, a receiver includes: an analog front end (AFE) circuit to receive and process an incoming radio frequency (RF) analog signal comprising a packet; an analog-to-digital converter (ADC) coupled to the AFE circuit to receive and digitize an analog signal based on the RF analog signal into a digital signal; a packet detector coupled to the ADC to detect the packet based on the digital signal; and a computation circuit coupled to the packet detector. The computation circuit may be configured to determine a received signal strength indicator (RSSI) value based at least in part on a portion of a preamble of the packet.

In one implementation, the receiver further comprises a timing circuit to determine a boundary between symbols of the packet. The computation circuit may be coupled to the timing circuit, and may determine the RSSI value based at least in part on at least one training field of the preamble of the packet. The computation circuit may determine the RSSI value further based on a predetermined training field. In an example, the computation circuit can determine the RSSI value further based on at least a portion of a data field of the packet.

In an implementation, the receiver further comprises a processing circuit coupled to the computation circuit, the processing circuit to determine an RSSI metric based at least in part on the RSSI value in response to a determination that the packet is from a desired source, and to discard the RSSI value in response to a determination that the packet is not from the desired source. A controller may be coupled to the processing circuit, to configure at least one component of the receiver based at least in part on the RSSI metric.

In an implementation, the receiver further comprises a processing circuit coupled to the computation circuit to determine an intra-frame average RSSI value based on a plurality of symbols of the packet. The processing circuit may further determine an inter-frame average RSSI value based on a plurality of packets.

In another aspect, a method comprises: detecting, in a receiver, a packet having a plurality of OFDM symbols; calculating, in a first computation circuit of the receiver, a RSSI value for at least one of the plurality of OFDM symbols; filtering the RSSI value if the packet is not intended for the receiver and processing the RSSI value if the packet is intended for the receiver.

In an example, processing the RSSI value comprises determining an average RSSI value using the RSSI value and one or more other RSSI values. Determining the average RSSI value may include determining an intra-frame RSSI value comprising an average of a plurality of RSSI values for at least some of the plurality of OFDM symbols of the packet. The method may further include weighting more recent RSSI values with a higher weighting than one or more earlier RSSI values when determining the intra-frame RSSI value. In another implementation, determining the average RSSI value comprises determining an inter-frame RSSI value comprising an average of a plurality of RSSI values for a plurality of packets.

In an implementation, the method further comprises: providing the processed RSSI value to a controller of the receiver; and controlling, via the controller, at least one configuration setting of at least one gain control circuit of the receiver based at least in part on the processed RSSI value.

In an implementation, calculating the RSSI value comprises using at least one preamble field of the packet, at least one signal field of the packet, and at least part of a data portion of the packet. In another implementation, calculating the RSSI value comprises: iteratively, for a plurality of subcarriers of frequency domain samples of the at least one of the plurality of OFDM symbols: multiplying a sum of a first preamble field of the packet and a second preamble field of the packet with a complex conjugate value to obtain a product; squaring the product; and summing the product with a running sum, the running sum comprising at least a portion of the RSSI value.

In yet another aspect, a system comprises: an analog front end (AFE) circuit to receive and downconvert an incoming RF signal comprising a packet into a second frequency signal; a digitizer coupled to the AFE circuit to receive and digitize the second frequency signal into a digital signal; a computation circuit coupled to the digitizer, the computation circuit to calculate a plurality of RSSI values based on one or more of a preamble field, a signal field, or a data field of the packet; a processing circuit coupled to the computation circuit, the processing circuit to determine an RSSI metric based on the plurality of RSSI values; and a controller coupled to the processing circuit, where the controller is to adapt a communication rate between the system and a station based at least in part on the RSSI metric.

In one implementation, the processing circuit is to determine the RSSI metric comprising an intra-frame average RSSI value based on the plurality of RSSI values, and averaged in a coherent manner. In another implementation, the processing circuit is to determine the RSSI metric comprising an inter-frame average RSSI value based on the plurality of RSSI values of the packet and a plurality of additional RSSI values of a plurality of additional packets, and averaged in a non-coherent manner.

DETAILED DESCRIPTION

In various embodiments, techniques are provided to enable improved, highly accurate RSSI measurements that in embodiments can improve overall system performance.

WLAN packets have a transmit address (originating device address (e.g., in the form of a Media Access Control/Basic Service Set ID (MAC/BSSID)) and a receive address (destination device address (MAC/BSSID)) at the start of a payload, so that the receiver device determines if the packet is destined for it and to decide to continue further decoding and processing of RSSI information.

On packet detection, the station starts decoding the packet. Then based on packet type detection and decoded data, the position of the BSSID of the transmitter within the packet is known. Based on the BSSID, it is determined if the current packet being decoded originated from an associated AP or not. Note that the BSSID location in packets/physical layer protocol data units (PPDUs) is different for aggregated or non-aggregated packets. When aggregated, the BSSID location in the decoded bitstream is determined to identify the BSSID. Also note that IEEE 802.11g packets are always not aggregated and IEEE 802.11ax packets are always aggregated. In case of IEEE 802.11n packets, aggregation is determined based on one of the bits present in the signal fields.

In embodiments, a filtering process is performed to determine and further process RSSI values for a given device pair combination, to more accurately compute/determine RSSI. To this end, an expected BSSID is programmed with the station or is known by the station during the association process. This identifier of an associated device for a device pair combination may be stored in a register or other storage. In a case of a multiple BSSID (MBSSID), an AP is identified with multiple BSSIDs, and thus a receiver can store all the BSSIDs that an AP can have, in one or more such registers or other storage and BSSID match is determined based on all these BSSIDs.

Once it is determined that the decoded BSSID matches with a desired BSSID, then computed RSSI values or root mean squared voltage (V_RMS) values can be further processed to determine a more accurate RSSI metric that can be used to more effectively control one or more receiver parameters and/or configuration. Details of this operation are described further below.

Figure 1:
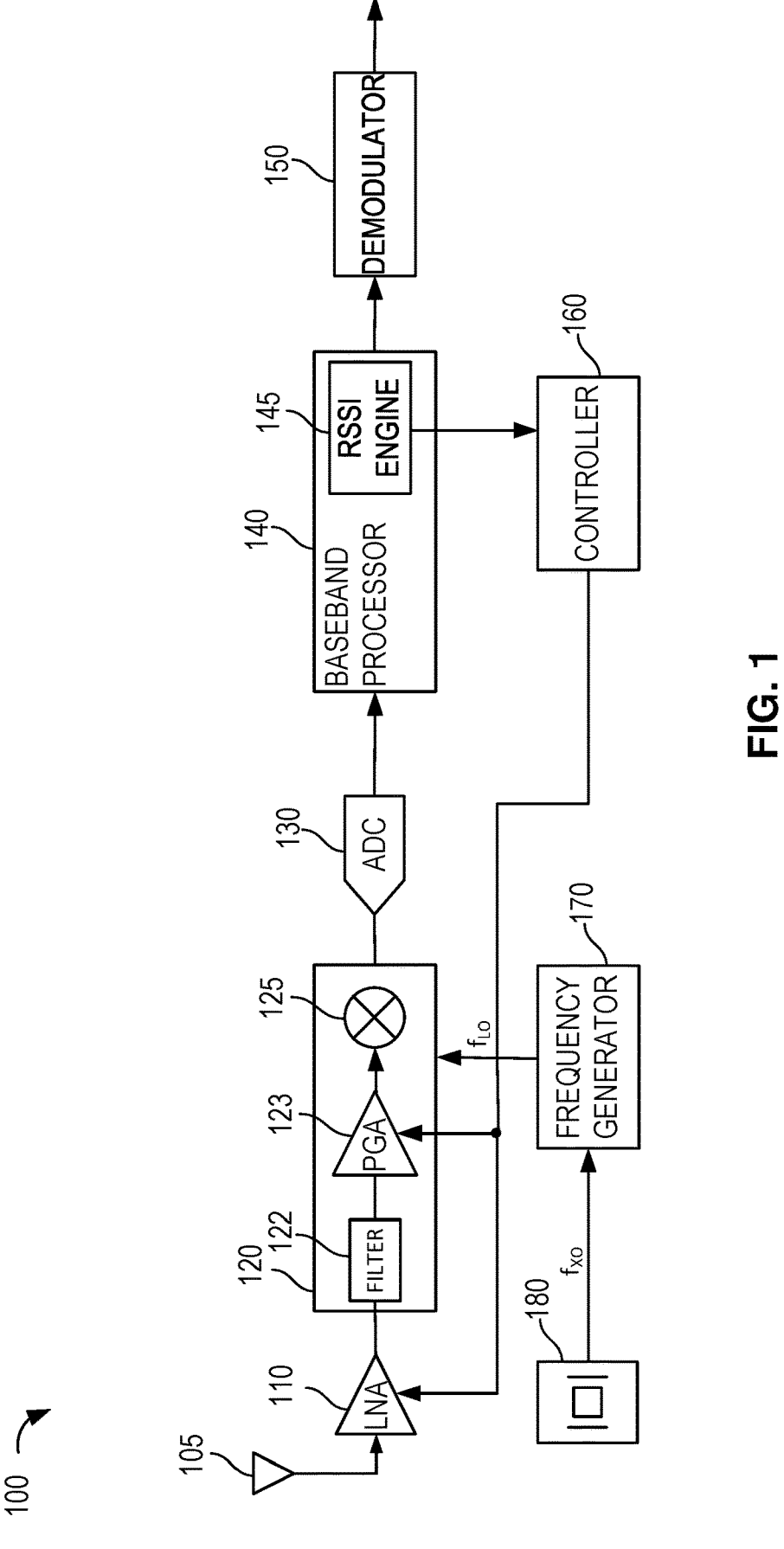
FIG. 1 is a block diagram of a receiver in accordance with an embodiment.

Referring now to FIG. 1, shown is a block diagram of a receiver in accordance with an embodiment. As shown in FIG. 1, receiver 100 may be implemented, in some cases, as a single semiconductor die receiver as included within an integrated circuit (IC). In such embodiments, all circuitry shown in FIG. 1 with the exception of an external antenna 105 and an external oscillator 180 (e.g., a crystal oscillator) may be implemented on the single semiconductor die.

In the embodiment shown, incoming radio frequency (RF) signals are received via antenna 105 and provided to a signal processing path including a low noise amplifier (LNA) 110. After appropriate amplification here, the incoming RF signals are provided to an analog front end (AFE) circuit 120. In various implementations, AFE circuit 120 may include various filtering circuitry including an analog filter 122, gain circuitry including a programmable gain amplifier (PGA) 123, and so forth. In some embodiments, gain of one or more of LNA 110 and PGA 123 may be dynamically controlled based on the gain setting coming as input from an automatic gain controller (AGC). In an embodiment, the AGC is part of a baseband processor 140, or a digital processing unit implemented in digital logic. In another embodiment, the AGC is implemented using analog circuitry. In an embodiment, the AGC determines the gains based on the V_RMS measurement on the input signal and current gain settings. Further as shown, AFE circuit 120 includes a mixer 125 configured to downconvert an RF signal to a lower frequency signal, e.g., an intermediate frequency (IF) signal such as a low-IF signal, zero IF signal, or other lower frequency signal.

To this end, mixer 125, which in some cases may be a complex mixer, is configured to downconvert the incoming RF signals using a mixing signal having a mixing frequency, shown as mixing signal ($f_{LO}$) received from a frequency generator 170. As one example, frequency generator 170 may be a local oscillator (LO) that may be implemented as a phase locked loop (PLL). Frequency generator 170 may generate the mixing signal using an incoming oscillator signal, $f_{XO}$, received from external oscillator 180.

Still referring to the signal processing path of receiver 100, the downconverted signals output from AFE circuit 120 are provided to a digitizer, shown in FIG. 1 as an analog-to-digital converter (ADC) 130, which digitizes the signals. In turn, these digitized signals, which may be at baseband, are provided to a baseband processor 140. Although shown as a standalone baseband processor in the FIG. 1 embodiment, baseband processor 140 in some cases may be implemented within a digital signal processor (DSP).

After various baseband processing, including filtering, digital mixing, decimation and so forth, resulting baseband-processed signals may be provided to a demodulator 150 that demodulates these signals. In different implementations, one of a variety of demodulation schemes may be used. For purposes of discussion herein, assume that demodulator 150 is configured to perform orthogonal frequency division multiplexing (OFDM) demodulation. The resulting demodulated signals may be output from demodulator 150 and provided to further downstream processing circuitry, such as an audio processor (not shown for ease of illustration in FIG. 1).

To more accurately determine RSSI information, baseband processor 140 may include an RSSI engine 145 (which may include computation, filtering, and other processing circuitry). Although shown as being included within baseband processor 140, in other implementations RSSI engine 145 may be a separate component. As will be described further herein, RSSI engine 145 may be configured to compute, filter and further process RSSI values for received signals to establish a highly accurate RSSI metric.

In an embodiment, RSSI engine 145 also may communicate resulting RSSI information to a controller 160. Although controller 160 is shown as a separate component in FIG. 1, it is possible in some implementations for this controller to be included within a baseband processor (or as part of a DSP in some implementations). In any event, controller 160 may include either dedicated or programmable hardware circuitry configured to control one or more parameters and/or configuration of receiver 100 based at least in part on the received RSSI information. To this end, controller 160 may include or be coupled to a non-volatile storage or other non-transitory storage medium to store instructions and data usable for such operation.

Based at least in part on the received RSSI information or the V_RMS value measured on the portion of the packet, controller 160 (which may include the AGC) may determine gain settings for front end components including LNA 110 and PGA 123. Of course additional components and/or configuration settings can be updated based at least in part on the received RSSI information or the V_RMS value measured and the RSSI information may be used to enable connection with a most appropriate AP. In the case of an AP itself, the RSSI information may be used to control rate adaptations, such as communicating at lower rates when a lower RSSI metric is present, and vice versa.

Understand while in the embodiment of FIG. 1, only a receiver signal processing path is shown for ease of illustration, such receiver may be part of a wireless transceiver further including transmit capabilities. Understand that while shown at this high level in the embodiment of FIG. 1, many variations and alternatives are possible.

Figure 2:
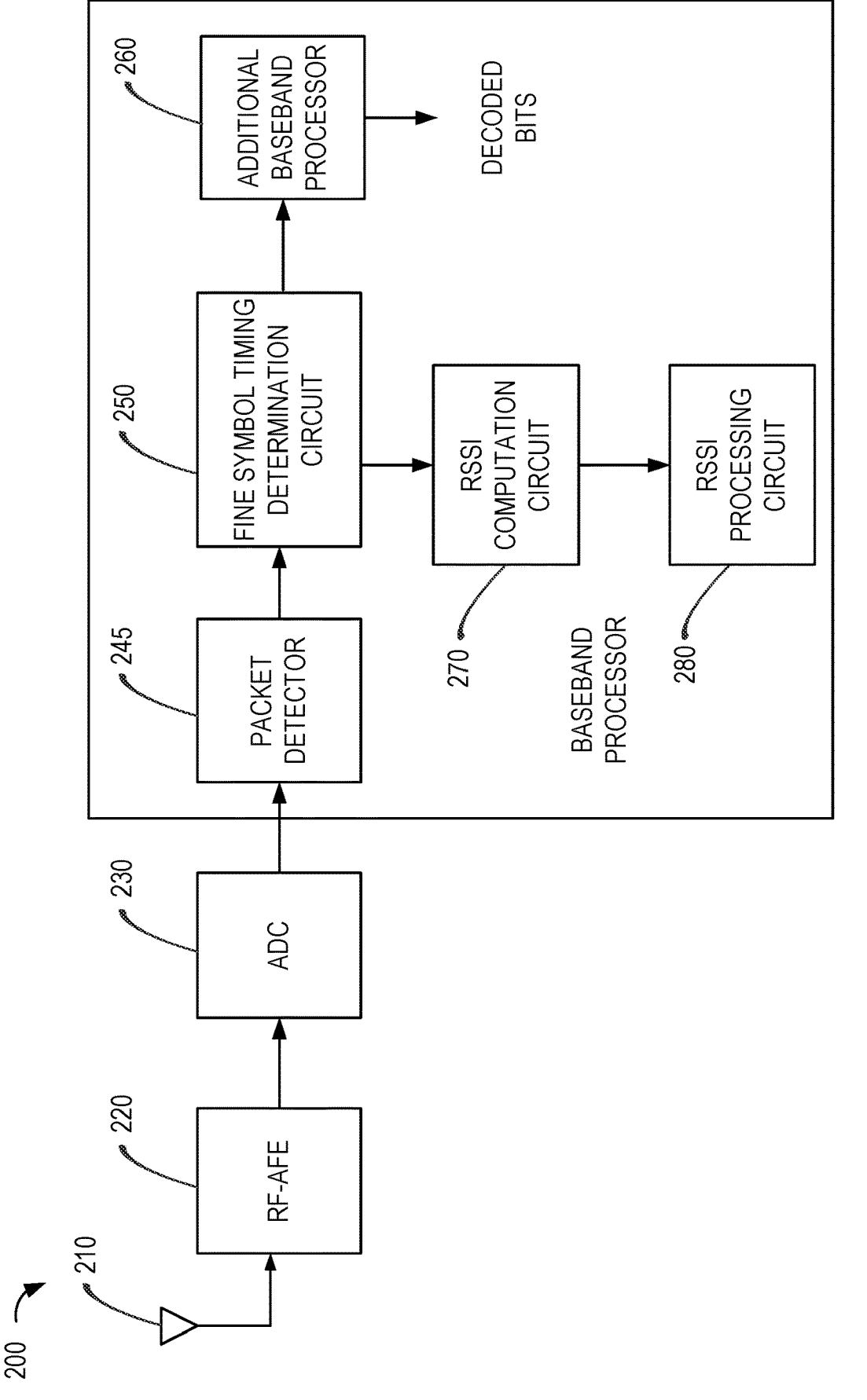
FIG. 2 is a block diagram of a receiver in accordance with another embodiment.

Referring now to FIG. 2, shown is a block diagram of a receiver in accordance with another embodiment. In an embodiment, receiver 200 may be implemented on a single semiconductor die (with the exception of an antenna 210).

As shown, an analog RF signal received from antenna 210 is processed by multiple blocks in an RF-AFE circuit 220. Such processing may include amplification in a LNA, filtering, additional gain control (e.g., within an automatic gain control (AGC) circuit), and so forth. Thus RF-AFE circuit 220 may perform various RF processing, including amplification, filtering and downconversion to a lower frequency.

Thereafter the processed analog signal is input to an ADC 230. ADC 230 converts the analog signal to discrete samples, which are given as an input to a baseband processor 240. As shown, baseband processor 240 includes constituent components. The incoming digitized samples are provided to a packet detector 245, which is configured to detect receipt of a WLAN packet. Thereafter OFDM symbol timing is determined by a fine symbol timing determination circuit 250. The fine symbol timing (FST) is obtained based on a legacy long training field (L-LTF) field, in an embodiment. Based on the FST, a symbol boundary between symbols (e.g., OFDM samples) is now known. As such, the samples corresponding to each OFDM symbol in time/frequency can be determined. In an embodiment, a RSSI computation circuit 270 is coupled to fine symbol timing determination circuit 250 to compute RSSI measurements using the samples from at least one OFDM symbol. Thereafter the RSSI values are provided to a RSSI processing circuit 280 that may further process the RSSI values as described herein.

On packet detection, receiver 200 parallelly starts decoding the packet in additional baseband processing circuitry 260, which may include a demodulator and decoder, and computes at least one RSSI metric or V_RMS value in RSSI computation circuit 270. Based on the decode data, the position of a MAC BSSID of the transmitter is known. Based on the BSSID, it is determined if the current packet that is being decoded originated from the associated AP or not. Once it is determined that the decoded BSSID matches an intended BSSID, then the RSSI of this packet is considered for further processing or else is discarded. Thus a packet filtering process is performed to remove RSSI values for packets that are not intended for the receiver and/or from an undesired source. This process is repeated for each packet detected by the station.

As described, BSSID location in packets/PPDUs is different for aggregated or non-aggregated packets. An identifier of an associated device for a device pair combination may be stored in a register or other storage. In a case of a MBSSID, an AP is identified with multiple BSSIDs, and thus a receiver can store all the BSSIDs that an AP can have in one or more such registers or other storage. A BSSID match is determined based on all these BSSIDs. Thus in the case of MBSSID, baseband processor 240 is programmed with all the BSSIDs that an AP can have, and a BSSID match is determined based on all these BSSIDs.

In one embodiment, a filtering process is done in hardware of baseband processor 240. In another embodiment, the filtering process is done in software and a status is provided to baseband processor 240. This process of filtering and then considering the RSSI or the V_RMS value for further usage is done at any device (Station/AP). The AP maintains RSSI measurement values for each individual station associated with it, in embodiments.

Understand while in the embodiment of FIG. 2 only a receiver signal processing path is shown for ease of illustration, such receiver may be part of a wireless transceiver further including transmit capabilities. Understand that while shown at this high level in the embodiment of FIG. 2, many variations and alternatives are possible.

While particular techniques are described below for determining RSSI, understand that different combinations or variations in these techniques are possible. Further, although embodiments are described in the context of a WLAN, understand that the techniques disclosed herein can be applied to other wireless systems.

In an embodiment, the RSSI is a function of a V_RMS value computed using the L-LTF field as shown below in Equation 1:

$$\sum_{k=0}^{K-1} \mathrm{abs}((Y_{LTF1}(k) + Y_{LTF2}(k))X_{LTF}^*(k))^2 \qquad \text{(Eq. 1)}$$

Where k is a subcarrier index, K is a total number of subcarriers, $Y_{LTF1}(k)$ are frequency domain samples from a received L-LTF portion (first period), $Y_{LTF2}(k)$ are frequency domain samples from the received L-LTF portion (second period), and $X_{LTF}^*(k)$ is a complex conjugate of a known LTF sequence. When averaging across symbols, frequency offset is ensured to be very low. The resulting RSSI metric is thus a function of RMS value formed from a given number of subcarriers of a given number of symbols.

In another embodiment, the RSSI is computed using signal fields, including a L-SIG and a repeated L-SIG (RL-SIG) field as shown below in Equation 2:

$$\sum_{k=0}^{K-1} \mathrm{abs}((Y_{L-SIG}(k) + Y_{RL-SIG}(k))X_{L-SIG}^*(k))^2 \qquad \text{(Eq. 2)}$$

Where $Y_{L-SIG}(k)$ are frequency domain samples from a received L-SIG portion, $Y_{RL-SIG}(k)$ are frequency domain samples from the received RL-SIG portion, and $X_{L-SIG}^*(k)$ is a complex conjugate of the decoded L-SIG symbols (constellation symbols).

In yet another embodiment, the RSSI is computed using L-LTF, L-SIG, and RL-SIG fields as shown below in Equation 3:

$$\sum_{k=0}^{K-1} \mathrm{abs}((Y_{LTF1}(k) + $$

$$Y_{LTF2}(k))X_{LTF}^*(k) + (Y_{L-SIG}(k) + Y_{RL-SIG}(k))X_{L-SIG}^*(k))^2 \qquad \text{(Eq. 3)}$$

In another embodiment, the RSSI is computed using L-LTF, L-SIG, and RL-SIG fields as shown below in Equation 4:

$$\mathrm{abs}\left(\sum_{k=0}^{K-1}(Y_{LTF1}(k) + \qquad \text{(Eq. 4)}\right.$$

-continued $$Y_{LTF2}(k))X_{LTF}^*(k) + (Y_{L-SIG}(k) + Y_{RL-SIG}(k))X_{L-SIG}^*(k))^2$$

In an embodiment, the RSSI is computed from preamble/signal fields, which are binary phase shift keying/quadrature phase shift keying (BPSK/QBPSK) modulated. In another embodiment, the RSSI is computed using a data field of a WLAN packet. In another embodiment, the RSSI is computed using the preamble/signal fields and data field of OFDM symbols of the WLAN packet. In an embodiment where the received packet is according to an IEEE 802.11ax specification, RSSI may be computed by averaging over signal and data fields, e.g., every fourth tone of a HE data portion of the packet is used for averaging with the non-HE portion of the packet.

Computing the RSSI across multiple OFDM symbols of a packet and obtaining a single metric/measurement is termed as intra-frame computation, and coherent averaging can be performed. Computing the RSSI across multiple WLAN packets and obtaining a single metric/measurement is termed as inter-frame computation, and non-coherent averaging can be performed.

In an embodiment, a receiver uses at least one of inter-frame averaging or intra-frame averaging processes to improve RSSI accuracy. Depending on implementation, a RSSI computation circuit (e.g., circuit 270 of FIG. 2) in accordance with an embodiment computes an RSSI or the V_RMS value for each OFDM symbol or pair of OFDM symbols. Thereafter a RSSI processor (e.g., circuit 280 of FIG. 2) performs additional processing of intra/inter-packet averaging.

In an embodiment, intra-frame averaging of RSSI or the V_RMS value may be performed over a windowed time duration of N microseconds (usec) and repeated for every P usec. In one embodiment the value of N is 200 usec and the value of P is 1000 usec. Inter-frame averaging may be performed over a window of every M usec. In one embodiment, the value of M is 10K usec. Averaging the RSSI across OFDM symbols in a packet and across packets ensures that a noise effect is reduced and increases the accuracy of the RSSI measurement for a link between the station and AP.

In an embodiment, the amount of averaging may be dependent on AGC gains used for the packet. As an example, if the AGC gains are set such that the LNA output is low, then this indicates that the signal is at a good level and probably at high signal-to-noise (SNR) also. For such packet, the averaging can be low. Let's suppose the averaging here can be for 5 OFDM symbols or every fifth OFDM symbol in a periodic averaging case.

In an embodiment, in part of RSSI computation is done using pair-wise samples as shown below in Equation 5:

$$\sum_{k=0}^{K-1} \text{abs}(H^*(k)H(k+1)X(k)X^*(k+1))^2 \qquad \text{(Eq. 5)}$$

Where H is the channel estimate, X is the data symbol, X* is conjugate of the data symbol and k is the sub-carrier index of the OFDM symbol.

In an embodiment, a current computation/measurement is given a higher weight compared to older computations/measurements as explained below in Equation 6.

$$\text{RSSI\_P}(g) = (1 - \delta) * \text{RSSI\_P}(g - 1) + \delta * RSSI(g) \qquad \text{(Eq. 6)}$$

Where $\delta > 0.5$, and RSSI (g) is the RSSI metric/measurement obtained for OFDM symbol number 'g' of a packet. RSSI_P (g) is the new RSSI metric obtained for a current OFDM symbol number g based of RSSI of current OFDM symbol "RSSI (g)" and all previous "g-1" OFDM symbols "RSSI_P (g-1)."

In an embodiment, the RSSI computation is function of LNA gain, VGA gain at the AGC lock stage and V_RMS of the IQs at the lock stage.

$$RSSI = \text{LNA\_Gain} + \text{VGA\_gain} + 20 * \log10(\text{V\_RMS}) + K \qquad \text{(Eq. 7)}$$

Where K is a constant to handle any bias conditions.

Figure 3:
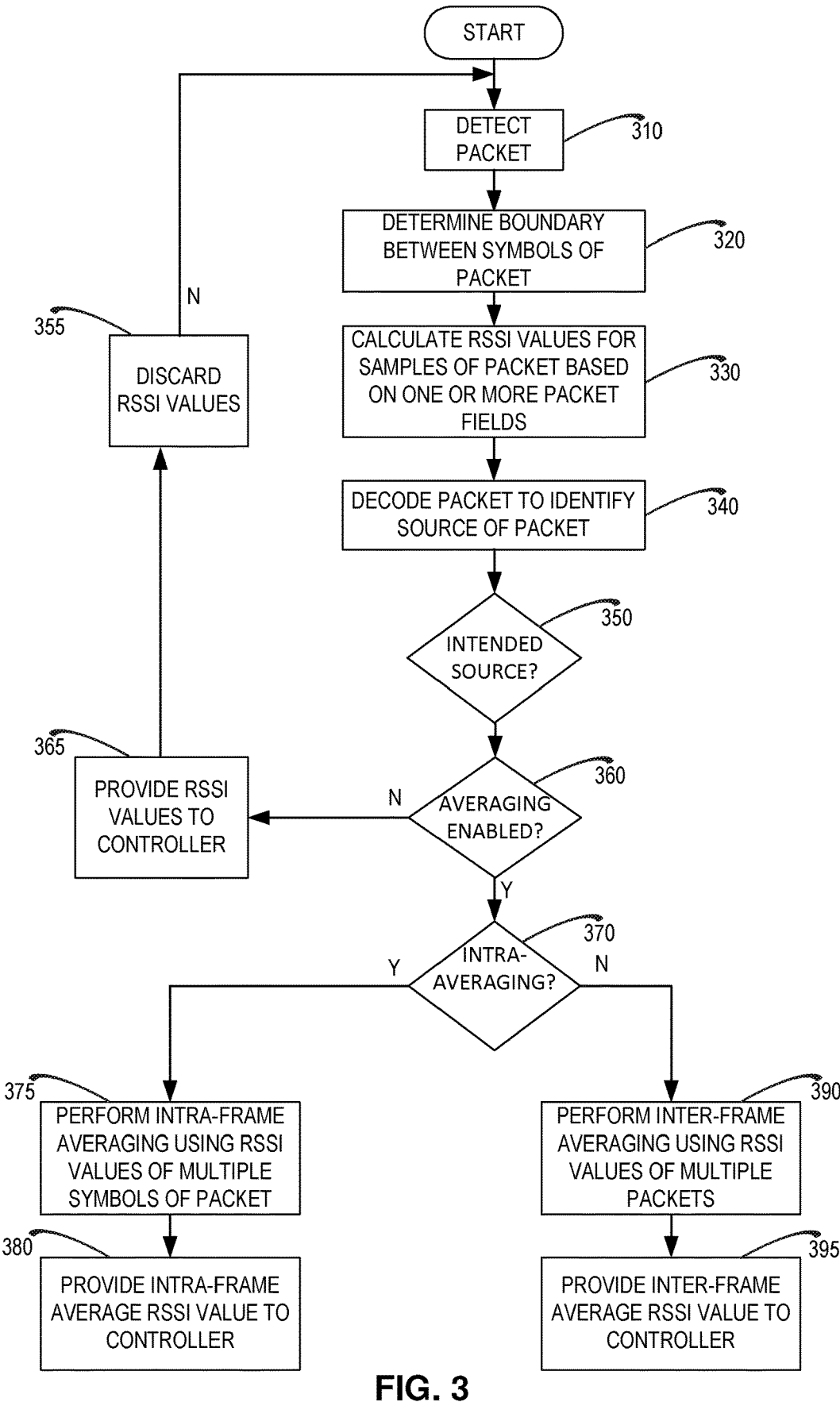
FIG. 3 is a flow diagram of a method in accordance with an embodiment.

Referring now to FIG. 3, shown is a flow diagram of a method in accordance with an embodiment. More specifically, method 300 is a method for performing filtered RSSI calculations in accordance with an embodiment. As such, method 300 may be performed by hardware circuitry including RSSI computation and processing circuits alone and/or in combination with firmware and/or software, which may be implemented as instructions stored in a non-transitory storage medium.

As shown, method 300 begins by detecting a packet (block 310). In an embodiment, packet detection may be based at least in part on detection of at least a portion of a preamble, e.g., one or more training fields. Next at block 320 a baseband processor may perform fine symbol timing to determine a boundary between symbols of the packet.

At this point, RSSI values may be determined for the packet. Thus at block 330 RSSI values may be calculated for samples of the packet based on one or more packet fields. For example, as discussed above depending upon implementation one or more of LTF, SIG and data fields may be used to compute RSSI or V_RMS values. Understand that depending upon implementation additional information may be used in determining RSSI or V_RMS values, including, for example, a known training field and/or decoded information such as decoded signal symbol information.

As further shown, in parallel with the RSSI computations, the packet may be decoded in a decoder (block 340, which may be performed in parallel with block 330). Based at least in part on the decoding, e.g., of a BSSID, a source of the packet can be identified. Accordingly, at diamond 350 it may be determined whether the packet is received from an intended source such as an AP with which the receiver is in communication. If not, at block 355 calculated RSSI values may be discarded and control passes back to block 310 for detection of another packet.

Still referring to FIG. 3, assuming the packet is received from an intended source, control passes to diamond 360 to determine whether RSSI averaging is enabled. In an example, such averaging may be enabled by default, or a controllable programmable setting can be used to control this functionality. If it is determined that such averaging is not enabled, RSSI values are provided to a controller at block 365.

When it is determined that averaging is enabled, control passes to diamond 370 to determine whether intra-frame averaging is enabled. If so, at block 380 processing circuitry may perform this intra-frame averaging using RSSI values of multiple symbols of the packet. Note that the averaging may be done over a windowed time duration and repeated over a second, longer time frame. The determined intra-frame average RSSI value can be provided to the controller (block 385). Understand that the controller may control one or more parameters and/or configuration of the receiver based at least in part on this intra-frame average RSSI value. For example, depending upon the value, one or more front end gain components and/or a receiver configuration can be dynamically controlled (e.g., increasing or decreasing gain values and/or a establishing a connection with a given AP). In the case of an AP itself, the controller may configure rate adaptations, among other things, based at least in part on this RSSI value.

Still referring to FIG. 3, if instead at diamond 370 it is determined that inter-frame averaging is to be performed, control passes to block 390. At block 390, processing circuitry may perform this inter-frame averaging using RSSI values of multiple packets (where the various processes of method 300 can be iteratively performed for multiple packets to obtain sufficient RSSI values for averaging). Note that the averaging may be done over a windowed time duration and repeated over a second, longer time frame (where these durations are longer than for the case of intra-frame averaging). The determined inter-frame average RSSI value can be provided to the controller (block 395), which can use the information in controlling one or more parameters or configuration of the receiver as discussed above.

Figure 4:
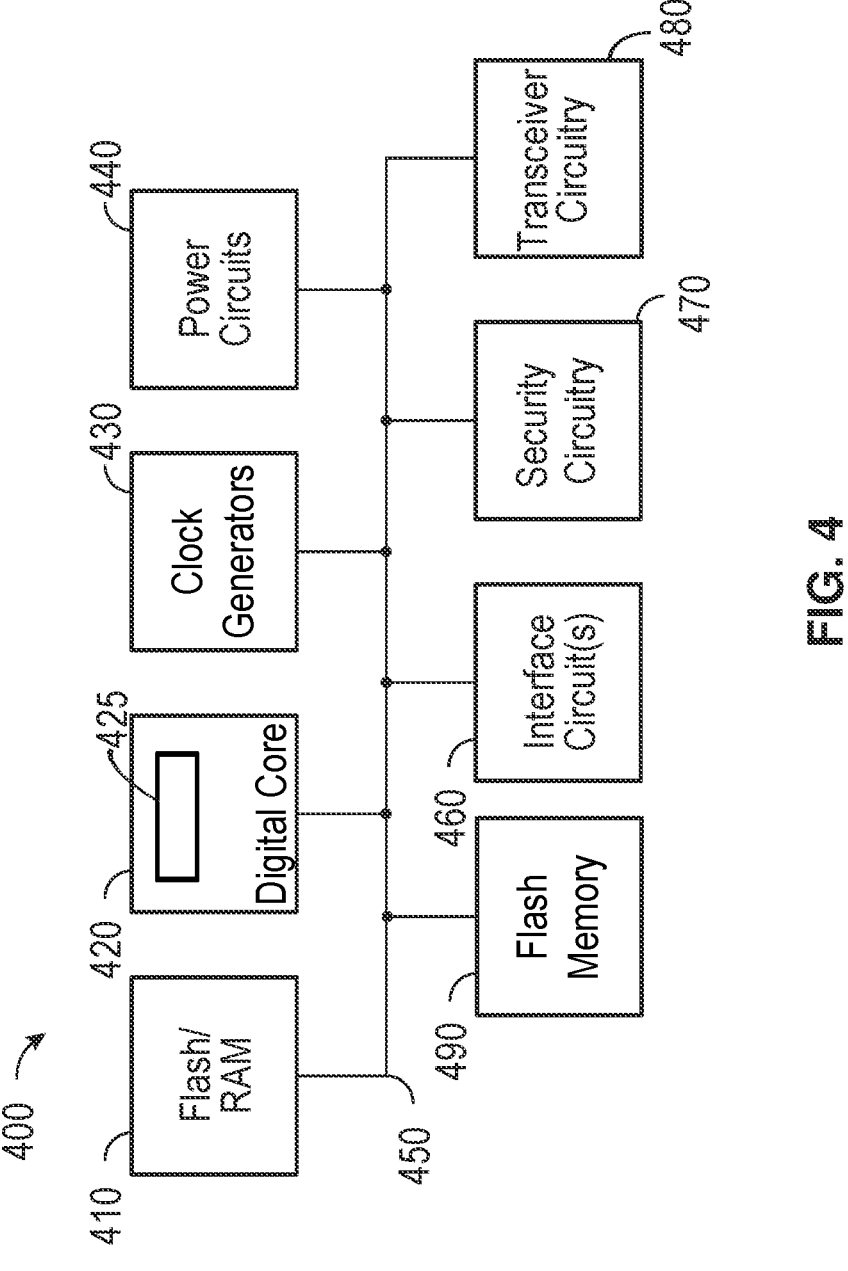
FIG. 4 is a block diagram of a representative integrated circuit that includes RSSI circuitry as described herein.

Referring now to FIG. 4, shown is a block diagram of a representative integrated circuit 400 that includes RSSI circuitry as described herein. In the embodiment shown in FIG. 4, integrated circuit 400 may be, e.g., a dual mode wireless transceiver that may operate according to one or more wireless protocols (e.g., WLAN and Bluetooth, among others) or other device that can be used in a variety of use cases. In one or more embodiments, the circuitry of integrated circuit 400 shown in FIG. 4 may be implemented on a single semiconductor die.

Integrated circuit 400 may be included in a range of devices including a variety of stations, including smartphones, wearables, smart home devices, other consumer devices, or industrial, scientific, and medical (ISM) devices, among others.

In the embodiment shown, integrated circuit 400 includes a memory system 410 which in an embodiment may include volatile storage, such as RAM and non-volatile memory as a flash memory. As further shown integrated circuit 400 also may include a separate flash memory 490 (or other non-volatile memory), optionally. Flash memory 490 may be implemented as a non-transitory storage medium that can store instructions and data. Such non-volatile memory may store instructions, including instructions for processing and using RSSI information as described herein.

Memory system 410 couples via a bus 450 to a digital core 420, which may include one or more cores and/or microcontrollers that act as a main processing unit of the integrated circuit. In turn, digital core 420 may couple to clock generators 430 which may provide one or more phase locked loops or other clock generator circuitry to generate various clocks for use by circuitry of the IC. As further shown, digital core 420 includes an RSSI circuit 425, which may process RSSI values as described herein and use the processed RSSI information control and configuration receiver circuitry. As further illustrated, IC 400 further includes power circuitry 440, which may include one or more voltage regulators. Additional circuitry may optionally be present depending on particular implementation to provide various functionality and interaction with external devices. Such circuitry may include interface circuitry 460 which may provide a LAN or other interface with various off-chip devices, and security circuitry 470 which may perform wireless security techniques.

In addition as shown in FIG. 4, transceiver circuitry 480 may be provided to enable transmission and receipt of wireless signals, e.g., according to one or more of a local area or wide area wireless communication scheme, such as Zigbee, Bluetooth, IEEE 802.11, IEEE 802.15.4, cellular communication or so forth. Understand while shown with this high level view, many variations and alternatives are possible.

Figure 5:
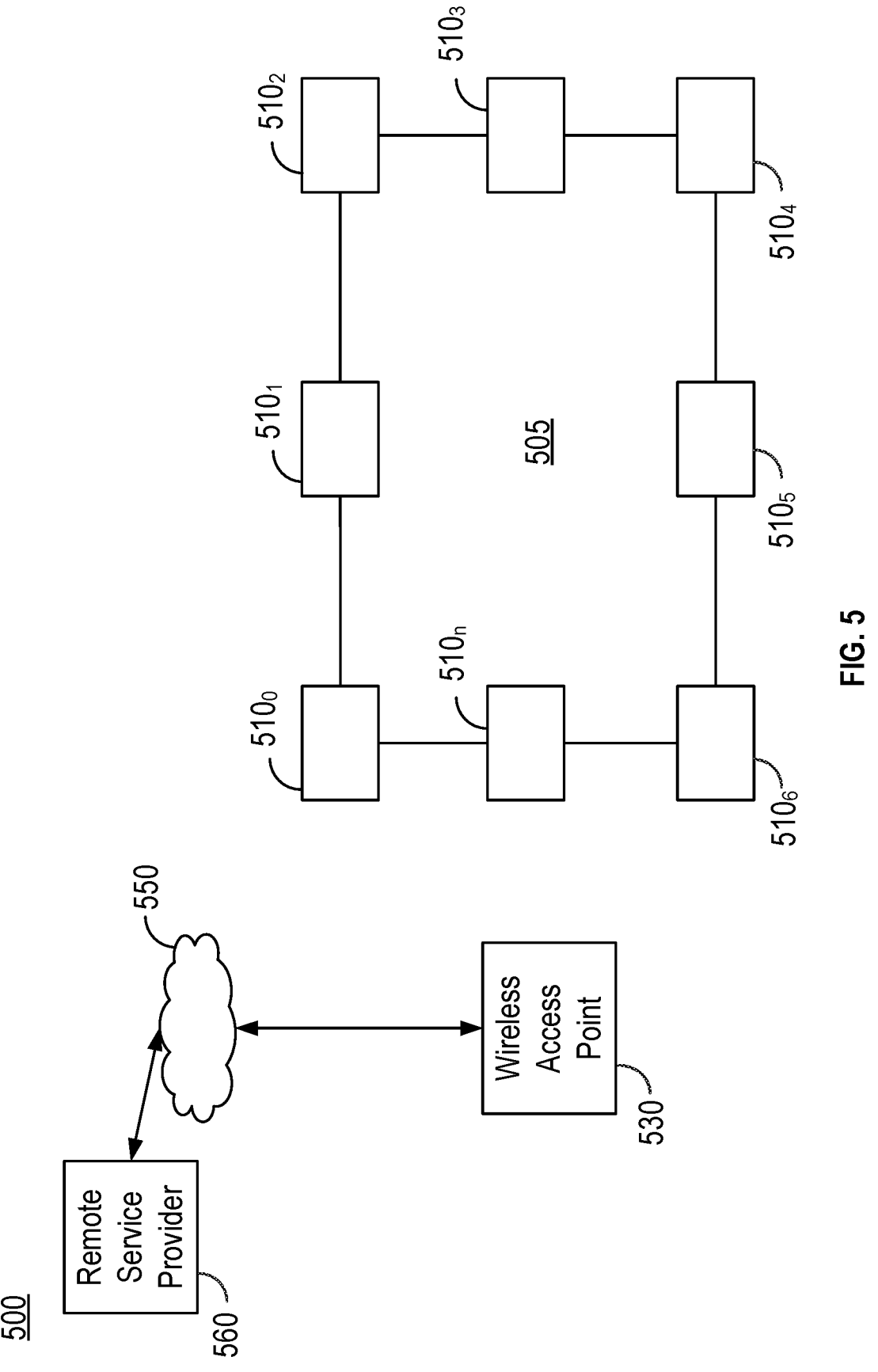
FIG. 5 is a high level diagram of a network in accordance with an embodiment.

ICs such as described herein may be implemented in a variety of different devices such as wireless stations, IoT devices or so forth. Referring now to FIG. 5, shown is a high level diagram of a network in accordance with an embodiment. As shown in FIG. 5, a network 500 includes a variety of devices, including wireless stations including smart devices such as IoT devices, access points and remote service providers, which may leverage embodiments to improve reliability of communication between devices and access points.

In the embodiment of FIG. 5, a wireless network 505 is present, e.g., in a building having multiple wireless devices 510₀₋ₙ. As shown, wireless devices 510 couple to an access point 530 that in turn communicates with a remote service provider 560 via a wide area network 550, e.g., the internet. Wireless devices 510 may process RSSI information and use the resulting processed RSSI information as described herein. Understand while shown at this high level in the embodiment of FIG. 5, many variations and alternatives are possible.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. A method comprising:

detecting, in a receiver, a packet having a plurality of orthogonal frequency division multiplexing (OFDM) symbols;

calculating, in a first computation circuit of the receiver, a received signal strength indicator (RSSI) value for at least one of the plurality of OFDM symbols; and filtering the RSSI value if the packet is not intended for the receiver and processing the RSSI value if the packet is intended for the receiver, comprising determining an average RSSI value, comprising determining an intra-frame RSSI value comprising an average of a plurality of RSSI values for at least some of the plurality of OFDM symbols of the packet, comprising weighting more recent RSSI values with a higher weighting than one or more earlier RSSI values when determining the intra-frame RSSI value.

2. The method of claim 1, further comprising determining an inter-frame RSSI value comprising an average of a plurality of RSSI values for a plurality of packets.

3. The method of claim 1, further comprising:

providing the processed RSSI value to a controller of the receiver; and controlling, via the controller, at least one configuration setting of at least one gain control circuit of the receiver based at least in part on the processed RSSI value.

4. The method of claim 1, wherein calculating the RSSI value comprises using at least one preamble field of the packet, at least one signal field of the packet, and at least part of a data portion of the packet.

5. The method of claim 1, wherein calculating the RSSI value comprises:

iteratively, for a plurality of subcarriers of frequency domain samples of the at least one of the plurality of OFDM symbols:

multiplying a sum of a first preamble field of the packet and a second preamble field of the packet with a complex conjugate value to obtain a product;

squaring the product; and summing the product with a running sum, the running sum comprising at least a portion of the RSSI value.

6. A system comprising:

an analog front end (AFE) circuit to receive and down-convert an incoming radio frequency (RF) signal comprising a packet into a second frequency signal;

a digitizer coupled to the AFE circuit to receive and digitize the second frequency signal into a digital signal;

a computation circuit coupled to the digitizer, the computation circuit to calculate a plurality of received signal strength indicator (RSSI) values based on one or more of a preamble field, a signal field, or a data field of the packet;

a processing circuit coupled to the computation circuit, the processing circuit to determine an RSSI metric based on the plurality of RSSI values, the RSSI metric comprising an intra-frame average RSSI value based on the plurality of RSSI values, and averaged in a coherent manner; and a controller coupled to the processing circuit, wherein the controller is to adapt a communication rate between the system and a station based at least in part on the RSSI metric.

7. The system of claim 6, wherein the processing circuit is to determine the RSSI metric further comprising an inter-frame average RSSI value based on the plurality of RSSI values of the packet and a plurality of additional RSSI values of a plurality of additional packets, and averaged in a non-coherent manner.

* * * * *